Patented Jan. 6, 1953

2,624,736

UNITED STATES PATENT OFFICE 2,624,736

2,2'-POLYMETHYLENE-BIPIPERIDINE COMPOUNDS

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application December 20, 1951,
Serial No. 262,681

6 Claims. (Cl. 260—293)

1

This invention relates to 2,2'-polymethylene-bis(1 - lower alkyl - 1 - nitrobenzyl - piperidinium salts) wherein the polymethylene chain contains from 5 to 8 methylene groups. The compounds of this invention may be represented by the following formula

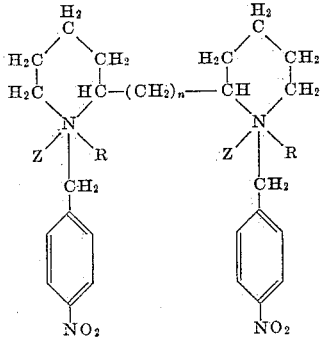

wherein R is a lower alkyl radical, Z is an anion, and n is an integer from 5 to 8, inclusive. The new compounds exhibit neuromuscular blocking activity and are useful as curare-like agents.

In general, the new compounds can be prepared by quaternizing 2,2'-polymethylenebis(1-lower alkyl-piperidines), wherein the polymethylene chain contains from 5 to 8 methylene groups, with a nitrobenzyl halide, e. g., p-nitrobenzyl bromide. The 2,2' - polymethylenebis(1 - lower alkyl-1-nitrobenzyl-piperidinium halides) thus obtained can be readily converted into other salts, e. g., by converting the piperidinium halides into the piperidinium hydroxides and reacting the latter with an acid.

The 2,2'-polymethylenebis(1-lower alkyl-piperidines) can, in general, be prepared by the catalytic hydrogenation of 2,2'-polymethylene-bis(1-lower alkyl-pyridinium halides) which are obtained by quaternizing 2,2'-polymethylene-dipyridines with a lower alkyl halide. The 2,2'-polymethylene-dipyridines can be prepared by reacting α-picolyl lithium with tri-, tetra-, penta-, and hexamethylene dibromide, respectively, to yield the corresponding 2,2'-penta-, hexa-, hepta-, and octa-methylene-dipyridines. The preparation of the aforesaid intermediates is illustrated by the following examples:

EXAMPLE A

2,2'-pentamethylene-dipyridine

To a stirred solution of phenyl lithium, prepared from 31 grams of lithium (4.4 grams atoms) and 345 grams (2.2 moles) bromobenzene in 1 liter ether, were added 186 grams (2 moles) of dry α-picoline. Into the resulting solution of α-picolyl-lithium were introduced dropwise 142 grams (0.7 mole) of trimethylene dibromide. After the addition was completed, the mixture was refluxed for 2 hours, and then treated with ice and concentrated hydrochloric acid (about 275 cc.). The strongly acid solution was extracted with ether to remove impurities. The aqueous layer was then made alkaline (250 cc. of 50% potassium hydroxide were used) and extracted with ether. The ether solution was concentrated in vacuo and the residue distilled in vacuo. In addition to a forerun and intermediate fractions, there was obtained 2,2'-pentamethylene-dipyridine, B. P. 153–154° C. at 1 mm. mercury pressure, refractive index $n_D^{25}=1.5478$.

EXAMPLE B

2,2'pentamethylene-dipyridine dimethobromide

A mixture of 34 grams of 2,2'-pentamethylene-dipyridine and 200 cc. of a 26% solution of methyl bromide in acetone was left standing at room temperature for 40–70 hours. The precipitated reaction product, 2,2'-pentamethylene-dipyridine dimethobromide, was filtered off and recrystallized from a mixture of methanol and acetone. It formed prisms melting at 199–203° C.

EXAMPLE C

2,2'-pentamethylenebis(1-methylpiperidine) dihydrobromide 50 grams of 2,2'-pentamethylene-dipyridine dimethobromide, dissolved in 150–200 cc. of 50% methanol, were hydrogenated in the presence of 1 gram of platinum oxide at room temperature and 70 atmospheres pressure. After the calculated amount of hydrogen had been absorbed, the mixture was filtered and concentrated in vacuo. The residue was crystallized from a mixture of methanol and acetone, forming needles, M. P. 216–224° C. Upon recrystallization, a product was obtained which melted at 235–238° C. The product is believed to be a mixture of the stereoisomers; namely, the dihydrobromides of racemic and meso - 2,2' - pentamethylenebis(1-methylpiperidine).

EXAMPLE D

2,2'-hexamethylene-dipyridine

To a stirred solution of phenyl lithium, prepared from 31 grams of lithium and 345 grams of bromobenzene in 1 liter of ether, were added 186 grams of dry α-picoline. Into the resulting solution of α-picolyl-lithium were introduced dropwise 152 grams (0.7 mole) of tetramethylene dibromide. After the addition was completed, the mixture was refluxed for 2 hours and treated with ice and concentrated hydrochloric acid (about 275 cc.). The strongly acid solution was extracted with ether to remove impurities. The aqueous layer was made alkaline (300 cc. of 50% potassium hydroxide were used) and extracted with ether. The ether solution was concentrated in vacuo and the residue distilled in vacuo. 2,2'-hexamethylene-dipyridine was obtained. It boiled at 160–165° C. at 0.5 mm. pressure and had a refractive index $n_D^{25}=1.5408$.

EXAMPLE E

*2,2'-hexamethylene-dipyridine dimethobromide*

A mixture of 34 grams of 2,2'-hexamethylene-dipyridine and 200 cc. of a 26% solution of methyl bromide in acetone was left standing at room temperature for 40–70 hours. The precipitated reaction product, 2,2'-hexamethylene-dipyridine dimethobromide, was filtered off and recrystallized from a mixture of methanol and acetone. It formed prisms melting at 225–228° C.

EXAMPLE F

*2,2'-hexamethylenebis(1-methylpiperidine) dihydrobromide*

47 grams of 2,2'-hexamethylene-dipyridine dimethobromide, dissolved in 200 cc. of 50% methanol, were hydrogenated in the presence of 1 gram of platinum oxide at room temperature and 70 atmospheres pressure. After the calculated amount of hydrogen had been absorbed, the mixture was filtered and concentrated in vacuo. The residue was dissolved in hot methanol, and upon addition of acetone and ether, a crystalline precipitate was obtained. The product melted at 222–234° C. Upon repeated fractional crystallization from ethanol and mixtures of ethanol, acetone, and ether, it yielded two fractions: (A) crystals melting at 249–250° C. and (B) crystals melting at 237–238° C. which were obtained from the mother liquors. It is believed that one of the fractions is the dihydrobromide of meso-2,2'-hexamethylenebis(1-methylpiperidine) and the other the dihydrobromide of racemic 2,2'-hexamethylenebis(1-methylpiperidine).

EXAMPLE G

*2,2'-heptamethylene-dipyridine*

To a stirred solution of phenyl lithium, prepared from 31 grams of lithium and 345 grams of bromobenzene in 1 liter of ether, were added 186 grams of dry α-picoline. Into the resulting solution of α-picolyl-lithium were introduced dropwise 161 grams (0.7 mole) of pentamethylene dibromide. After the addition was completed, the mixture was refluxed for 2 hours and treated with ice and concentrated hydrochloric acid (about 275 cc.). The strongly acid solution was extracted with ether to remove impurities. The aqueous layer was made alkaline (with about 250 cc. of 50% potassium hydroxide) and extracted with ether. The ether solution was concentrated in vacuo and the residue distilled in vacuo. 2,2'-heptamethylene-dipyridine was obtained, B. P. 166–168° C. at 0.8 mm. pressure; $n_D^{24}=1.5379$.

EXAMPLE H

*2,2'-heptamethylene-dipyridine dimethobromide*

A mixture of 34 grams of 2,2'-heptamethylene-dipyridine and 200 cc. of a 26% solution of methyl bromide in acetone was left standing at room temperature for 40–70 hours. The precipitated reaction product, 2,2'-heptamethylene-dipyridine dimethobromide, was filtered off and recrystallized from a mixture of methanol and acetone. It formed prisms melting at 202–204° C.

EXAMPLE I

*2,2'-heptamethylenebis(1-methylpiperidine) dihydrobromide*

50 grams of 2,2'-heptamethylene-dipyridine dimethobromide dissolved in 150–200 cc. of 50% methanol were hydrogenated in the presence of 1 gram of platinum oxide at room temperature and 70 atmospheres pressure. After the calculated amount of hydrogen had been absorbed, the mixture was filtered and concentrated in vacuo. The residue was recrystallized from a mixture of methanol and acetone. Two different fractions of needle-shaped crystals were isolated, one having a melting point of 214–217° C., and the other, 216–221° C.

EXAMPLE J

*2,2'-octamethylene-dipyridine*

To a stirred solution of phenyl lithium, prepared from 24 grams of lithium (3.4 grams atoms) and 268 grams (1.7 moles) bromobenzene in 700 cc. of ether, were added 140 grams (1.5 moles) of dry α-picoline. Into the resulting solution of α-picolyl-lithium were introduced dropwise 100 grams (0.41 mole) of hexamethylene dibromide. After the addition was completed, the mixture was refluxed for 2 hours and treated with ice and concentrated hydrochloric acid. The strongly acid solution was extracted with ether in order to remove impurities. The aqueous layer was made alkaline and extracted with ether. The ether solution was concentrated in vacuo and the residue distilled in vacuo, yielding 2,2'-octamethylene-dipyridine, B. P. 177° C. at 0.6 mm. pressure; $n_D^{26}=1.5339$.

EXAMPLE K

*2,2'-octamethylene-dipyridine dimethobromide*

A mixture of 26 grams of 2,2'-octamethylene-dipyridine and 150 cc. of a 26% solution of methyl bromide in acetone was left standing at room temperature for 40–70 hours. The precipitated reaction product, 2,2'-octamethylene-dipyridine dimethobromide, was filtered off and recrystallized from a mixture of methanol and acetone. It formed prisms melting at 200–201° C.

EXAMPLE L

*2,2'-octamethylenebis(1-methylpiperidine) dihydrobromide*

20 grams of 2,2'-octamethylene-dipyridine dimethobromide dissolved in 200 cc. of 50% methanol was hydrogenated in the presence of 1 gram of platinum oxide at room temperature and 70 atmospheres pressure. After the calculated amount of hydrogen had been absorbed, the mixture was filtered and concentrated in vacuo. The residue was recrystallized from a mixture of methanol and acetone, and formed needles, M. P. 205–215° C. The product is believed to be a mixture of the dihydrobromides of racemic and meso- 2,2'-octamethylenebis(1-methylpiperidine).

The following examples will serve to illustrate the preparation of the 2,2'-polymethylenebis(1-lower alkyl-1-nitrobenzyl-piperidinium salts):

EXAMPLE 1

To 200 cc. of water containing 14 grams of 2,2'-pentamethylenebis(1-methyl-piperidine) dihydrobromide, the product obtained as described in Example C, were added 50 cc. of 6 N sodium hydroxide to make the solution strongly alkaline. The aqueous solution was extracted with chloroform, and the extract was dried and evaporated in vacuo. The 2,2'-pentamethylenebis(1-methylpiperidine) thus obtained was dissolved in 25 cc. of benzene, and 75 cc. of benzene containing 10 grams of p-nitrobenzyl bromide were added. After warming for 5 minutes on the steam bath, the reaction mixture was allowed to stand at 25° C. for 18 hours. The crystals which formed were recrystallized from methanol and from aqueous methanol. The 2,2' - pentamethylenebis[1 - (p-nitrobenzyl) - 1 - methylpiperidinium bromide] monohydrate thus obtained melted at 231-232° C. with decomposition.

EXAMPLE 2

(a) A solution made up of 100 cc. of water and 13.3 grams of the 2,2'-hexamethylenebis(1-methylpiperidine) dihydrobromide, M. P. 249-250° C., described in Example F, was made strongly alkaline by the addition of 50 cc. of 6 N sodium hydroxide. The alkaline solution was extracted with chloroform, and the chloroform extract was evaporated to dryness in vacuo. 4.8 grams of the 2,2'-hexamethylenebis(1-methylpiperidine) thus obtained were dissolved in 25 cc. of benzene, 7.5 grams of p-nitrobenzyl bromide in 50 cc. of benzene were than added, and the resulting solution was warmed on the steam bath for 5 minutes. The reaction mixture was allowed to stand at 25° C. for 18 hours. The crystals which formed were separated and recrystallized four times from dilute methanol. The 2,2'-hexamethylenebis[1-(p-nitrobenzyl)-1-methylpiperidinium bromide] thus obtained melted at 242-243° C. with decomposition.

(b) The 2,2' - hexamethylenebis(1 - methylpiperidine) dihydrobromide, M. P. 237-238° C., described in Example F, was treated in the same manner as described under (a) above. The 2,2'-hexamethylenebis[1 - (p-nitrobenzyl)-1 - methylpiperidinium bromide] thus obtained melted at 236-238° C. with decomposition.

EXAMPLE 3

10½ grams of the fraction of 2,2'-heptamethylenebis(1 - methylpiperidine) dihydrobromide, M. P. 214-217° C., as obtained in Example I, were dissolved in 100 cc. of water, the solution made strongly alkaline by the addition of 50 cc. of 6 N sodium hydroxide, and extracted well with chloroform. The chloroform extract was dried and evaporated to dryness in vacuo. The 2,2'-heptamethylenebis(1 - methylpiperidine) thus formed was dissolved in 50 cc. of benzene. 100 cc. of benzene containing 7.6 grams of p-nitrobenzyl bromide were added and the reaction mixture allowed to stand at 25° C. for 48 hours. The crystals which formed were recrystallized from a mixture of methanol, acetone, and ether to yield 2,2' - heptamethylenebis[1 - (p - nitrobenzyl) - 1-methylpiperidinium bromide] monohydrate, M. P. 105-110° C.

EXAMPLE 4

16 grams of 2,2'-octamethylenebis(1-methylpiperidine) dihydrobromide, obtained as described in Example L, were dissolved in 200 cc. of water, the solution made strongly alkaline by the addition of 50 cc. of 6 N sodium hydroxide, and then extracted with chloroform. The chloroform extract was dried and evaporated to dryness in vacuo at 60° C. The 2,2'-octamethylenebis(1-methylpiperidine) thus obtained was dissolved in 200 cc. of benzene, and 100 cc. of benzene containing 14.7 grams of p-nitrobenzyl bromide were added. After refluxing for 1 hour, the reaction mixture was allowed to stand at 25° C. for 18 hours. The crystals which formed were filtered and recrystallized from methanol to yield 2,2'-octamethylenebis[1 - (p - nitrobenzyl) - 1-methylpiperidinium bromide], M. P. 235-237° C.

It will be understood that our invention embraces the compounds in all stereoisomeric forms as well as the anhydrous and hydrated forms, and the claims are to be so construed.

We claim:

1. 2,2'-polymethylenebis(1-lower alkyl-1-nitrobenzyl-piperidinium salts) wherein the polymethylene chain contains from 5 to 8 methylene groups.

2. 2,2' - polymethylenebis[1-(p-nitrobenzyl)-1-methylpiperidinium halides] wherein the polymethylene chain contains from 5 to 8 methylene groups.

3. 2,2' - pentamethylenebis[1-(p-nitrobenzyl)-1-methylpiperidinium bromide].

4. 2,2' - hexamethylenebis[1-)p-nitrobenzyl)-1-methylpiperidinium bromide].

5. 2,2' - heptamethylenebis[1-(p-nitrobenzyl)-1-methylpiperidinium bromide].

6. 2,2' - octamethylenebis[1-(p-nitrobenzyl)-1-methylpiperidinium bromide].

MOSES WOLF GOLDBERG.
LESTER MISCHA JAMPOLSKY.

No references cited.